Figure 1:
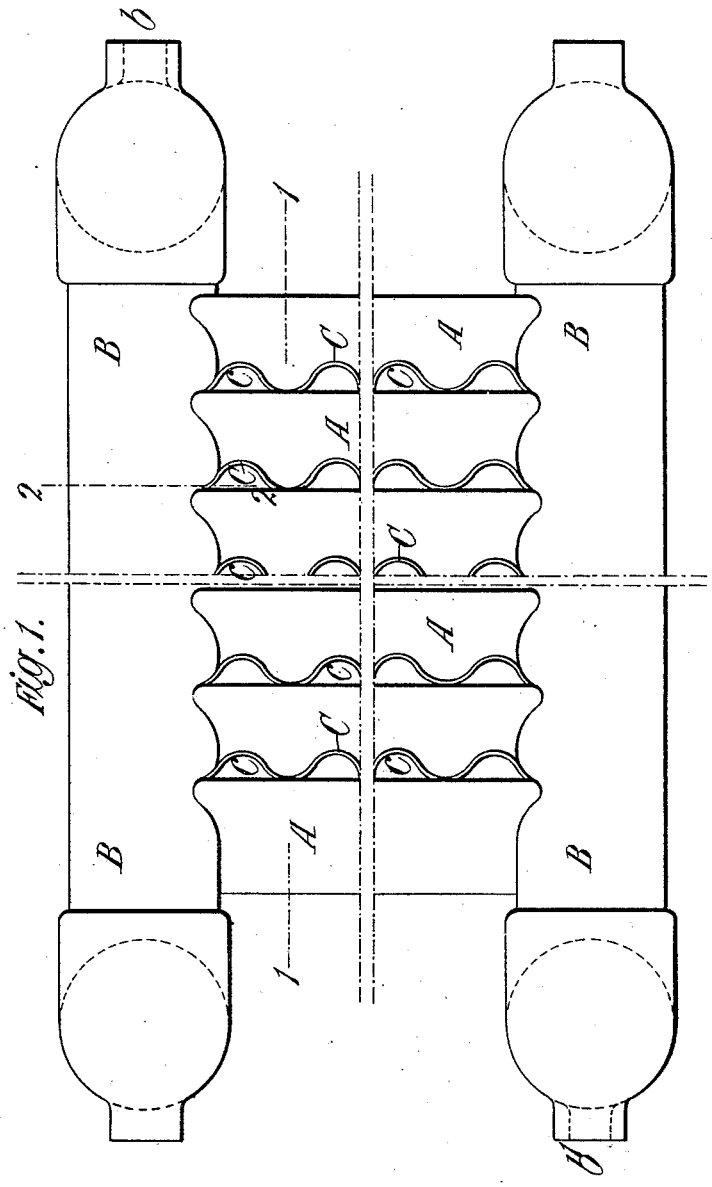

No. 713,776. Patented Nov. 18, 1902.
F. LAMPLOUGH.
CONDENSER.
(Application filed Dec. 14, 1901.)

(No Model.) 2 Sheets—Sheet 1.

WITNESSES
E. A. Allen.
M. E. Coveney.

INVENTOR
FREDERICK LAMPLOUGH.
BY HIS ATTORNEY
Edward S. Beach.

THE NORRIS PETERS CO., PHOTO-LITHO., WASHINGTON, D. C.

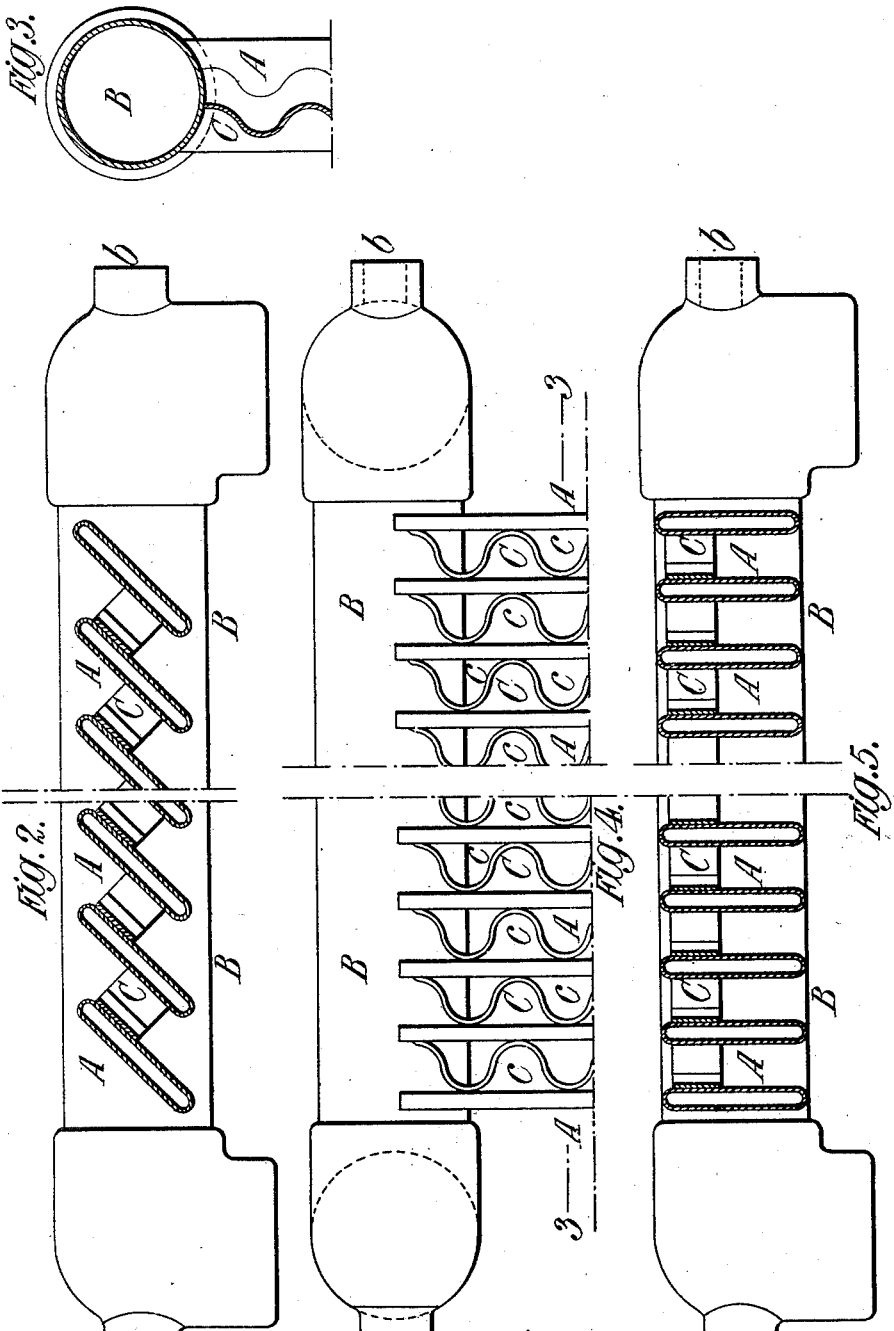

UNITED STATES PATENT OFFICE.

FREDERICK LAMPLOUGH, OF WILLESDEN, LONDON, ENGLAND.

CONDENSER.

SPECIFICATION forming part of Letters Patent No. 713,776, dated November 18, 1902.

Application filed December 14, 1901. Serial No. 85,864. (No model.)

*To all whom it may concern:*

Be it known that I, FREDERICK LAMPLOUGH, engineer, a subject of the King of Great Britain, residing at 6 Scrubbs Lane, Cumberland Park, Willesden, in the county of London, England, have invented certain new and useful Improvements in Condensers or Cooling Devices, of which the following is a specification.

This invention has reference to a condensation or cooling device which is more particularly intended for use as an air surface condenser on steam-propelled road-vehicles for the purpose of condensing the exhaust-steam and enabling the water of condensation to be returned to the storage-tank or hot-well.

According to my invention the device consists of a grid-like structure comprising a series of tubes communicating at their ends with transverse pipes or chambers and having between them bent or corrugated strips of metal, which act as stays for preventing deformation of the tubes and as heat-radiating surfaces of large area. The said tubes are preferably of elongated or flattened shape in cross-section and may be located in planes perpendicular to or at an inclination to the said transverse pipes or chambers. The said device is arranged on the vehicle in such a position that a current of air is induced to flow between said tubes and impinge upon the said metallic strips by the motion of the vehicle, thereby acting upon a large heat-radiating surface and rapidly abstracting the heat of the steam or hot liquid in the said device without offering undue resistance to the wind when the vehicle is traveling.

In the accompanying drawings, Figure 1 is an elevation of a portion of my device adapted for use as an air surface condenser. Fig. 2 is a horizontal section taken approximately on the line 1 1 of Fig. 1, and Fig. 3 is a transverse section on the line 2 2 of Fig. 1. Fig. 4 is an elevation, and Fig. 5 a horizontal section on the line 3 3 of Fig. 4, showing a modified form of the device.

A A are the series of tubes of flattened shape in cross-section, B B the transverse pipes or chambers, and C C the bent metallic strips located between said tubes A.

In Figs. 1 to 3 the said tubes A are arranged in inclined planes to the axis of the said pipes or chambers B, with which they communicate at their opposite ends, while in Figs. 4 and 5 the said tubes A are arranged in planes perpendicular to the said pipes or chambers B. The said metallic strips are of corrugated form and are composed of what is commonly known as "ribbon brass," said strips being brazed or soldered in place between said tubes A, thereby forming a very large heat-conducting surface, having numerous transverse channels $c$ $c$ for the air to pass between the tubes and absorb the heat from said tubes and strips during the traveling of the vehicle.

The condenser is preferably located at the front of the vehicle in an inclined position, with the upper pipe or chamber B in advance of the lower pipe or chamber. The exhaust-steam from the engine enters the upper pipe or chamber through the inlet $b$, and the water of condensation trickles down the said tubes A and reaches the lower pipe or chamber, whence it may flow from the outlet $b'$ by the action of gravity or of a feed-pump into the feed-tank through an oil-separator or not, as may be found desirable. In practice I find that a slight back pressure in the exhaust of the engine gives sufficient pressure to cause the water of condensation to flow into the feed-tank, the uncondensed portion of the steam being permitted to escape into the atmosphere from the said tank.

When the device is used as a hot-water cooler, it would be similarly arranged, the hot water being forced through it by means of any suitable form of pump.

What I claim as my invention, and desire to secure by Letters Patent of the United States, is—

1. A device consisting in the combination of a series of flattened tubes, of transverse pipes through which said tubes communicate at their ends, of corrugated metallic strips located edgewise between said tubes to prevent deformation thereof and to act as heat-radiating surfaces, and of conduits through which fluid enters and leaves the device substantially as and for the purpose described.

2. An air surface steam-condenser for steam-propelled vehicles, having in combination a series of flattened tubes connected at their opposite ends by transverse pipes and arranged with their edges in transverse planes with respect to said pipes, corrugated metallic strips located between the tubes, the position of said tubes and strips being such that they lie more or less edgewise to the direction of travel of the vehicle, and conduits through which the steam enters the condenser and leaves in the form of condensed water, substantially as and for the purpose specified.

In testimony whereof I have hereunto set my hand, in presence of two subscribing witnesses, this 21st day of November, 1901.

FREDERICK LAMPLOUGH.

Witnesses:
 THOS. P. WARDLY,
 WALTER J. SKERTEN.